FILE SELECTION SYSTEM

Filed June 26, 1964

INVENTORS
KENNETH D. FOULGER
JOHN J. HARMON
BY Ronald J. Clark
ATTORNEY

United States Patent Office 3,344,403

Patented Sept. 26, 1967

3,344,403

FILE SELECTION SYSTEM

Kenneth D. Foulger and John J. Harmon, San Jose, Calif., assignors to International Business Machines Corporation, New York, N.Y., a corporation of New York Filed June 26, 1964, Ser. No. 383,541
6 Claims. (Cl. 340—172.5)

ABSTRACT OF THE DISCLOSURE

The present file selection system allows random access files written on or in response to a first data processing system to be utilized in a second data processing system having a different and distinct configuration. This is achieved through the use of special indicia and the circuitry responsive thereto indicating that the address retrieved from the program indicates that a new data processing system is being employed to interrogate the records on the random access file. In a first mode of operation, the disclosed circuitry operates to decode the address in a straightforward manner. In a second mode of operation responsive to the special indicia, a second decoding mode of operation is followed.

This invention relates to data handling circuits and more particularly, to a file selection system for controlling the selection of a single disk module in a plurality of data processing systems.

The widespread utilization of data processing systems requires added flexibility in the file selection process. A Random Access File (RAF) comprises a plurality of independent disk modules, magnetic drums, or closed loop storage bins. A single disk module comprises a plurality of magnetic surfaces and each of these surfaces holds a plurality of separately addressable sections. Normally, a disk module has data written thereon for use with a single data processing system. Each section includes an address portion for differentiating each section from every other section in the same disk module and from every other section in the additional disk modules employed with the same processor. However, it is desirable to provide a system wherein a disk module that is originally used with one processing system can be employed with a second data processing system. Using standard addressing techniques, this is not possible since part of the address selects the module in which the message is stored. Therefore, unless the disk module employed in the first processing system is placed in the corresponding module position in the second processing system, messages can not be retrieved therefrom. For illustration, in a processing system employing a single data processor and five disk modules, the addresses of the messages written in the fifth disk module include indicia to select the fifth module. When it is necessary to substitute this disk module in a data processing system originally employing only two disk modules or using a plurality of substituted modules originally written in the same module position, added indicia is employed to distinguish the substituted modules without rewriting the addresses for all the messages on each module.

Accordingly, it is an object of the instant invention to provide a file selection circuit which permits the use of a disk module in a plurality of separate data processing systems.

It is a further object of the instant invention to provide a file selection circuit responsive to an alternate selection indicia designating the disk module on which the message is written.

According to these objects, the instant invention employs the core memory interrogation circuits of its associated data processor to locate the core memory address of the message address to be transferred between a disk module and the processor. The message address comprises one portion of a Disk Control Field (DCF) stored in core memory. Additionally, the DCF includes an alternate control indicia indicating a normal data transfer between a data processor and its own disk modules, or a data transfer between a data processor and a substituted disk module. Additionally, a decode circuit responsive to the alternate control indicia selects the substituted module.

Figure 3:
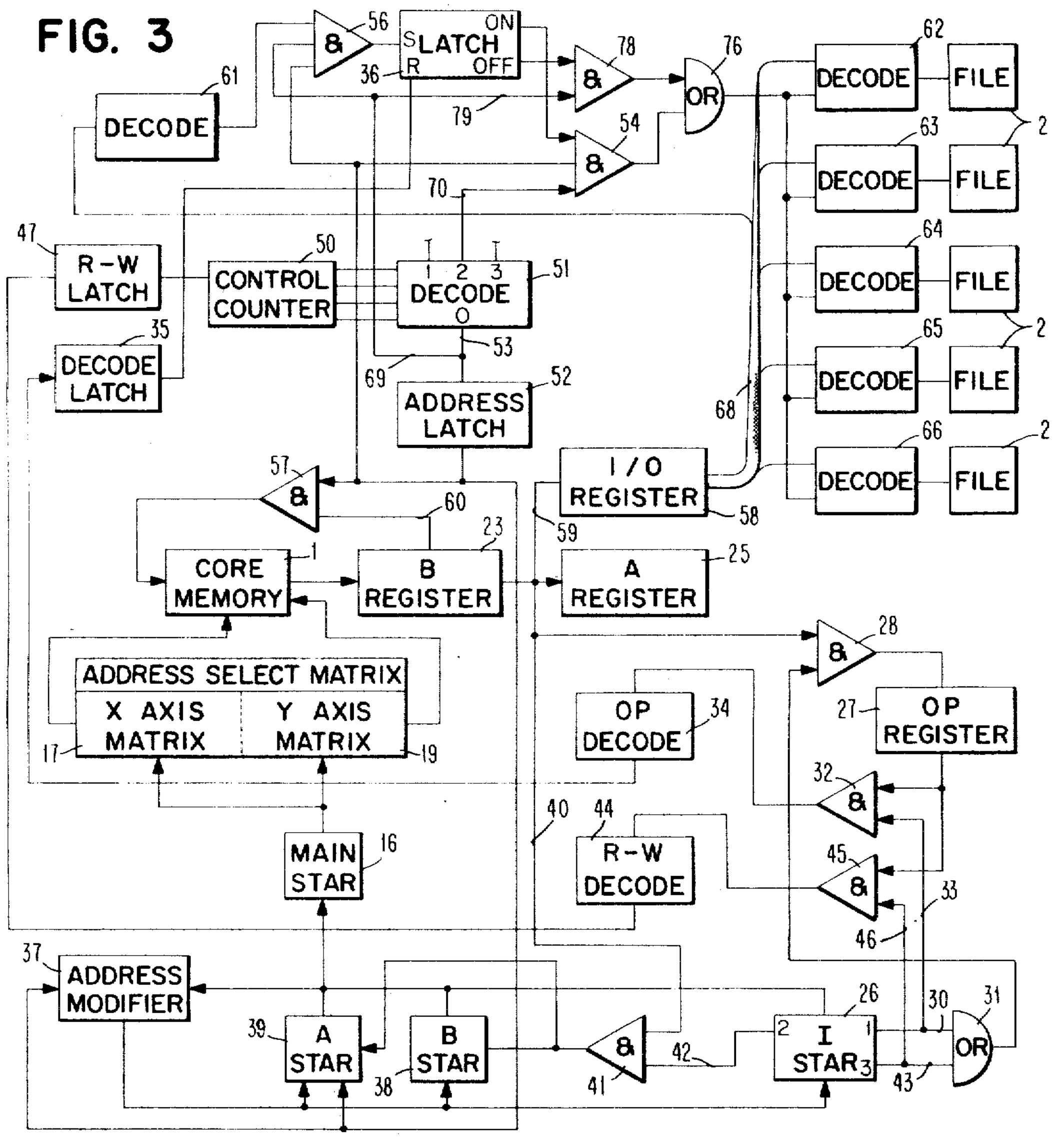
Figure 2:
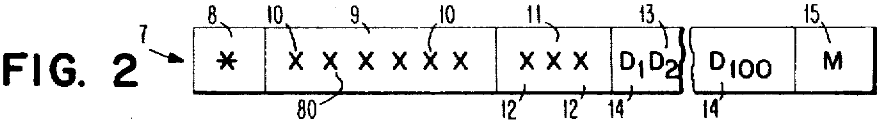
Figure 1:
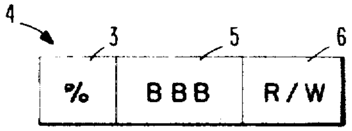

The foregoing and other objects, features and advantages of the invention will be apparent from the following more particular description of a preferred embodiment of the invention, as illustrated in the accompanying drawings; wherein FIG. 1 is a schematic representation of an operation code employed by the associated processor in a file select operation;

FIG. 2 is a schematic representation of the Disk Control Field format employed in the instant invention; and FIG. 3 is a block diagram of the instant invention.

FIG. 3 shows a computer core memory 1 and a plurality of RAF modules 2 employed in the instant invention. The interrogation of the memory 1 is completely described by F. O. Underwood in his U.S. Patent 3,077,580, entitled Data Processing System, and assigned to the assignee of the present invention. For a better understanding of this memory interrogation circuitry as employed in the instant invention, the operation of these circuits are again shown and described. However, the detailed operation of these circuits is not repeated. Additionally, standard circuits are identified by name and are not described in detail since they are well known to those skilled in the art.

Referring to FIG. 1, a first portion 3 of an operation code 4 is reserved for indicia indicating that the computer core memory 1 is to be engaged in a transfer operation with one of the files 2. A second portion 5 of this operation code contains additional indicia designating the address location in the core memory 1 of the first indicia in the Disk Control Field (DCF), described hereinafter, of the message to be transferred. A third portion 6 of the operation code 4 contains indicia indicating that a read or write transfer is to be performed.

FIG. 2 shows a typical DCF format 7 held in the core memory 1. A first area 8 of the DCF format comprises indicia indicating a normal module selection process or an alternate method of selecting a substituted module. If the alternate method of module selection is indicated, this indicia determines which module is selected. A second area 9 of the DCF format 7 holds a plurality of address characters 10 which indicate the section address of a RAF section into which or from which the message is transferred. A third area 11 of the DCF format 7 normally holds a plurality of section characters 12 which indicate the length of the message to be transferred according to the number of sections involved in the data transfer. A final area 13 contains a plurality of data characters 14 including a message ending indicia 15. In the cases when data is read from the file to core memory 1, the final area 13 of the DCF format 7 is left blank so that data characters from the file can be stored during the data transfer operation.

FIGS. 1 and 2 show schematic representations of the indicia and characters employed in the operation code 4 and the DCF format 7 respectively. Obviously, these indicia and characters are actually stored in magnetic cores as a pattern of coded magnetic signals.

Referring again to FIG. 3, the core memory 1 contains all the information for controlling the internal operation of the processor and the data transfer operation between the processor and one of the files 2. Each character in the DCF format 7 is set up in a separate storage location in core memory 1 by standard programming techniques which need not be described. In the present description, successive storage locations hold the characters in the DCF format 7 for simplifying the understanding of the memory interrogation process. Obviously, other interrogation processes could be employed. Each storage location in core memory 1 is interrogated by a main Storage Address Register (STAR) 16 and an address select matrix circuit comprising an X axis matrix 17 and a Y axis matrix 19. Upon the interrogation of a particular core memory location, the character or indicia stored therein is read out into a B register 23 and/or an A register 25.

The core storage address of the first indicia of the operation code 4, shown in FIG. 1, is set into an I STAR 26 by standard computer advancement techniques. That is, as soon as one computer operation is completed, the computer advances to the next programmed operation. The indicia in the first portion 3 of the operational code 4 is interrogated under the control of the I STAR 26 and the main STAR 16 and it is transferred to an operation register 27 by the B register 23 and an AND gate 28. The I STAR 26 also generates a plurality of enabling output signals which correspond to the various portions of the operation code 4. The first enabling output signal from the I STAR 26 is applied to the AND gate 28 by a line 30 and an OR gate 31 and it is also applied to an AND gate 32 by the line 30 and a line 33. The operation register 27 is connected to an operation decode circuit 34 by the AND gate 32. The indicia in portion 3 of the operation code 4 indicates the type of operation performed between the file 2 and the core memory 1. The operation decode circuit 34 comprises a diode matrix for decoding the indicia in portion 3 and it applies the decoded output signal to a decode latch 35. The output of the latch 35 is employed as an enabling signal to the read or write transducer (not shown) of the selected file 2 allowing data characters to pass between the core memory 1 and the selected file 2. Additionally, the output signal of the latch 35 is employed to reset an alternate control latch 36 to its second stable condition.

An address modifier circuit 37 receives an input signal from the I STAR 26, a B STAR 38, and an A STAR 39 after their interrogation of each core memory storage location. Prior to the interrogation of the next storage location, the modifier 37 applies its output to the I STAR 26 advancing the address held in the I STAR 26 to the next adjacent core memory storage location. The B STAR 38 and the A STAR 39 receive advancing signals from the address modifier circuit 37 when either of these registers is directing the interrogation of the core memory 1.

During the continued interrogation of the core memory 1 by the I STAR 26, the second portion 5 of the operation code 4 is transferred to the A STAR 39 and the B STAR 38 by the B register 23, a line 40 and an AND gate 41. The AND gate 41 has a second input signal on a line 42, which signal is the second enabling output signal from the I STAR 26. The A STAR 39 and the B STAR 38 now contain the address in the core memory 1 of the first indicia of the DCF format 7. The I STAR 26 continues its control of the interrogation of the core memory 1 and transfers the third portion 6 of the operation code 4 to the operation register 27 by the AND gate 28. The AND gate 28 receives an enabling input signal from the I STAR 26 by a line 43 and the OR gate 31. The output from the register 27 is applied to a read/write decode circuit 44 by an AND gate 45. The AND gate 45 has a second input signal from the I STAR 26, which signal is applied to the AND gate 45 by the line 43 and a line 46. The output of the decode circuit 44 is stored in a read/write latch 47 for later use in transferring the message from one of the selected files 2 to the core memory 1. However, in the operation of the instant invention the setting of the latch 47 is employed to indicate the completion of the operation code interrogation operation. The output of the latch 47 is applied to a control counter 50 setting it to its binary zero position.

The control counter 50 is a standard counter circuit and may comprise four stages giving the counter a maximum binary count of sixteen positions which are normally labeled position zero through position fifteen. The output signals from each stage in the counter are applied to a decode circuit 51 which generates a single enabling signal corresponding to each position of the counter. The counter 50 advances simultaneously with the interrogation operation to be described hereinafter. More specifically, the counter is in its zero position during the interrogation of area 8 of the DCF format 7 and advances an additional position during the interrogation of each of the address characters in the area 9. The zero position of the control counter 50 is decoded in the decode circuit 51 and applied to an address transfer latch 52 by a line 53. The output of the address transfer latch is applied to a plurality of AND gates 54, 56 and 57. Additionally, the output of the latch 52 is applied to the address modifier circuit 37 and to the A STAR 39.

The signal applied to the A STAR 39 from the latch 52 transfers the control of the core memory 1 interrogation operation from the I STAR 26 to the A STAR 39. The A STAR 39 contains the core memory 1 address of the first indicia in the DCF format 7. This indicia is read from core storage 1 into the B register 23 and from there it is transferred to an I/O register 58 and to the AND gate 57 by a pair of lines 59 and 60 respectively.

Since the AND gate 57 already has its enabling signal applied thereto from the latch 52, the first indicia of the DCF format 7 interrogated from core memory 1 and transferred to the B register 23 is reinserted into the same address location in core memory 1 by the AND gate 57. The output of the I/O register 58 is applied to a plurality of decode circuits 61 through 66 by a line 68. This first indicia could be represented by any standard coding format. However, for the purpose of this application four-bit binary coded indicia and characters are employed, therefore, the line 68 comprises four independent conductors. Additionally, the binary coded indicia and characters are applied to the decode circuits 61 through 66 in parallel.

The alternate control decode circuit 61 responds to the alternate control indicia by generating an output signal for application to the AND gate 56. The AND gate 56 has two additional input signals one of which is from decode position zero over the line 53 and a line 69, and the other of which is the enabling output signal from the address transfer latch 52. The output from the AND gate 56 sets the alternate control latch 36 to its first stable state wherein it applies its "ON" or first enabling output signal to the AND gate 54. The AND gate 54 has two additional input signals; one of which is from the decode two position by a line 70, and the other of which is the enabling output signal from the address transfer latch 52. The output from the AND gate 54 is applied to an OR gate 76. The "OFF" or second output signal of the alternate control latch 36 is applied to an AND gate 78, which gate has a second enabling input signal on the line 69 and a line 79 from the decode zero position of the decode circuit 51. The AND gate 78 is connected to the OR gate 76. The output of the OR gate 76 is applied as an enabling signal to the decode circuits 62–66.

In operation, the alternate control latch 36 is normally in its reset or "OFF" position. The A STAR 39 controls the interrogation of the core memory locations storing areas 8 and 9 of the DCF format 7 shown in FIG. 2. Therefore, in response to an alternate control indicia represented by a first set of binary magnetic signals, the decode circuit 61 sets the alternate control latch 36 to its first stable state furnishing an enabling signal to the AND gate 54. The AND gate 54 generates an output signal upon the application of the decode two signal on the line 70. The decode two signal corresponds to a character 80 in the area 9 shown in FIG. 2. The output of the AND gate 54 is applied as an enabling signal to the decode circuits 62 through 66 through the OR gate 76. Therefore, the character 80 is employed to select one of the modules 2. However, if the alternate control indicia is any other combination of binary coded magnetic signals and the alternate decode circuit 61 is not responsive thereto, the alternate control latch 36 remains in its off condition and its second enabling output signal or "OFF" signal is applied to the OR gate 76 by means of the AND gate 78. Since the AND gate 78 is enabled by the zero position of the decode circuit 51, the indicia contained in the first area 8 of the DCF format is then decoded by the decode circuits 62–66 for the selection of a substituted module 2. Therefore, since the area 8 is set up in core memory 1 by programming techniques, any desired module position can be designated by the indicia in this area.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system employing a computer responsive to predetermined operation codes for transferring data between the computer and a plurality of file modules, selection circuitry for designating a desired one of the file modules to operate with the computer, said selection circuitry comprising, a storage circuit,
alternate control indicia stored in said storage circuit,
a plurality of address characters stored in said storage circuit,
an alternate control decode circuit responsive to said indicia for selectively generating a normal operation signal or a substituted operation signal,
first means responsive to said normal operation signal and one of said address characters for designating one of said modules,
said means being responsive to said substituted signal and said indicia for selecting the same module, and
second means responsive to a predetermined one of the operation codes for transferring said alternate control indicia to said alternate control circuit and for transferring said address characters to said first means.

2. In a data processing system employing a computer responsive to predetermined operation codes for transferring data between the computer and a plurality of file modules, selection circuitry for designating a desired one of the file modules to operate with the computer, said selection circuitry comprising, a storage circuit,
alternate control indicia stored in said storage circuit,
a plurality of address characters stored in said storage circuit,
a plurality of decode circuits each controlling the designation of a different one of the modules,
an alternate control circuit responsive to said indicia for selectively generating a normal operation signal or a substituted operation signal,
first means responsive to said normal operation signal and one of said address characters for activating a particular decode circuit corresponding to such address character, and
second means responsive to a predetermined one of the operation codes for transferring said alternate control indicia to said alternate control circuit and for transferring said address character to said first means.

3. In a data processing system employing a computer responsive to predetermined operation codes, and selection circuitry for designating a desired one of a plurality of file modules to operate with the computer, characterized in that said selection circuitry comprises, a storage circuit,
alternate control indicia stored in said storage circuit,
a plurality of address characters stored in said circuit,
a plurality of decode circuits each controlling the designation of a different one of the modules,
an alternate control circuit responsive to said indicia for selectively generating a normal operation signal or a substituted operation signal,
first means responsive to said normal operation signal and one of said address characters for activating a particular decode circuit corresponding to such address character,
second means responsive to said substituted operation signal and said indicia for activating a particular decode circuit corresponding to said indica, and
third means responsive to a particular one of the operation codes for transferring said alternate control indicia and said address characters to said alternate control circuit and said first and second means.

4. In a data processing system employing a computer responsive to predetermined operation codes for transferring data between the computer and a plurality of file modules, selection circuitry for designating a desired one of the file modules to operate with the computer, said selection circuitry comprising, a storage circuit,
alternate control indicia stored in said storage circuit,
a plurality of address characters stored in said storage circuit,
a plurality of decode circuits each controlling the designation of a different one of the modules,
an alternate control decode circuit responsive to said indicia for selectively generating a normal operation signal or a substituted operation signal,
first means responsive to said normal operation signal and one of said address characters for activating a particular decode circuit corresponding to such address character,
second means responsive to said substituted operation signal and said indicia for activating such particular decode circuit corresponding to said indicia,
third means responsive to a predetermined one of the operation codes for transferring said alternate control indicia to said alternate control circuit and for transferring said address character to said first means and said second means, whereby any particular module may be designated selectively by said first means or said second means.

5. In a data processing system employing a computer responsive to predetermined operation codes for transferring data between the computer and a plurality of file modules, selection circuitry for designating a desired one of the file modules to operate with the computer, said selection circuitry comprising, a storage circuit,
alternate control indicia stored in said storage circuit,
a plurality of address characters stored in said storage circuit,
a plurality of decode circuits each controlling the designation of a different one of the modules,
an alternate control circuit responsive to said indicia for selectively generating a normal operation signal or a substituted operation signal,
first means responsive to a predetermined one of the operation codes for successively transferring said alternate control indicia to said alternate control circuit and said address character to said decode circuits, second means including a counter responsive to said transfer means for generating a plurality of output signals each corresponding to said transfer of successive indicia and address characters, third means responsive to said substituted operation signal and one of said output signals for activating a particular decode circuit corresponding to said indicia being transferred, and fourth means responsive to said normal operation signal and a second one of said output signals for activating a particular decode circuit corresponding to said address character being transferred.

6. In a data processing system employing a computer responsive to predetermined operation codes for transferring data between the computer and a plurality of file modules, selection circuitry designating a desired one of the file modules to operate with the computer, said selection circuitry comprising, a storage circuit, alternate control indicia stored in said storage circuit, a plurality of address characters stored in said storage circuit, a plurality of decode circuits each controlling the designation of a different one of the modules, an alternate control circuit responsive to said indicia for selectively generating a normal operation signal or a substituted operation signal, first means responsive to a predetermined one of the operation codes for successively transferring said alternate control indicia to said alternate control circuit and said address characters to said decode circuits, second means including a counter responsive to said transfer means for generating a plurality of output signals each corresponding to said transfer of successive indicia and address characters, third means responsive to said substituted operation signal and one of said output signals for activating a particular decode circuit corresponding to said indicia being transferred, fourth means responsive to said normal operation signal and a second one of said output signals for activating a particular decode circuit corresponding to said address character being transferred, and said second means and third means activating the same file module.

References Cited

UNITED STATES PATENTS

| | | | |
|---|---|---|---|
| 3,221,307 | 11/1965 | Manning ---------- | 340—172.5 |
| 3,248,709 | 4/1966 | Betz ------------- | 340—172.5 |
| 3,283,306 | 11/1966 | Patrusky ---------- | 340—172.5 |
| 3,312,950 | 4/1967 | Hillman et al. ----- | 340—172.5 |

ROBERT C. BAILEY, *Primary Examiner.*

PAUL J. HENON, *Examiner.*